United States Patent [19]

Farmer, III et al.

[11] 4,171,983
[45] Oct. 23, 1979

[54] CAPILLARY TYPE INK

[75] Inventors: Robert F. Farmer, III; Phillip E. Sokol, both of Rockville, Md.

[73] Assignee: The Gillette Company, Boston, Mass.

[21] Appl. No.: 855,947

[22] Filed: Nov. 30, 1977

[51] Int. Cl.² ............... B43K 5/00; C09D 11/00
[52] U.S. Cl. ........................... 106/22; 106/23; 401/198; 401/199
[58] Field of Search ............ 106/22, 23; 8/84, 172 R; 401/198, 199

[56] References Cited

U.S. PATENT DOCUMENTS

| | | | |
|---|---|---|---|
| 3,519,443 | 7/1970 | Kaplan et al. | 106/22 |
| 3,581,378 | 6/1971 | Jozens | 29/434 |
| 3,705,405 | 12/1972 | Nadolski | 343/112 CA |
| 3,778,495 | 12/1973 | Woolley | 4/177 F |
| 3,995,997 | 12/1976 | Boehmke et al. | 8/84 |

*Primary Examiner*—J. Ziegler
*Attorney, Agent, or Firm*—Richard A. Wise; Leonard J. Janowski

[57] ABSTRACT

Ink compositions for use in capillary type writing instruments containing quaternary ammonium of the formula:

$$RCH_2N(CH_3)_3{}^+X^-$$

wherein
R is —$CH_2OH$ or —COOH, and
X is —OH, —Cl, —Br, or —I.

These ink compositions, when used in capillary type writing instruments, allow rejuvenation of writing points which have dried out from exposure to the atmosphere.

7 Claims, No Drawings

CAPILLARY TYPE INK

BACKGROUND OF THE INVENTION

1. Field of the Invention

This invention relates to an ink for use in capillary type writing instruments, and more particularly, to aqueous ink compositions promoting rejuvenation after the writing tip of a capillary type writing instrument has dried out from exposure to the atmosphere.

2. Description of the Prior Art

A problem frequently encountered by people who use capillary type writing instruments is writing point dryout. Capillary type writing instruments include those pens or marking devices which have fiber, felt, or porous plastic type writing points which deliver ink from a reservoir to the writing point by means of capillary action. The inks used in capillary type writing instruments have generally been of two types: (1) water based inks containing water soluble dyes, (the inks of the present invention), and (2) inks which contain organic solvents and dyes which are soluble in an organic medium.

Capillary type writing instruments employ a variety of types of fiber, felt, and porous plastic writing points. Felt is a fabric of natural and/or synthetic fibers worked together by pressure, heat, or chemical action without weaving or knitting. The fibers tend to be arranged in a random fashion. When felt is used as a writing point, the ink is conveyed through the interstices between the individual fibers by capillary action.

A second major type of writing point is made by bonding together a bundle of parallel strands of either natural or synthetic fibers (e.g. polyvinyl chloride, polyethylene, or polyamide polymers) to form capillary pathways between the bundles leading to the writing point. U.S. Pat. No. 3,558,392 is an example of such a point. The fibrous point is made by setting a bundle of parallel strands of synthetic fibers in a desired relation by drawing the bundle through a heat-setting zone to establish dimensions in cross-section of the final object and to create longitudinally extending channels. The strength of the point is subsequently increased by immersion in a dilute resin solution followed by heating to evaporate the solvent and cure the resin. Depending on the denier of the fibers of the particular yarn which is used to form the writing point, a number of channels will be formed having average or mean transverse dimensions of from $1 \times 1$ mils. to $3 \times 6$ mils. Channels of 1.5 to 3 mils. in one transverse direction and between 3 and 6 mils. in another direction are representative of the most desirable channel sizes. Thus, the capillary channels are typically between 4.5 and 18 sq. mils. in cross-sectional area.

An example of another type of writing point is described in U.S. Pat. No. 3,778,495. The point described there is an elongated unitary writing element made by extruding and melt-drawing a polymer (e.g. acrylic, acetal, polyamide, or polyester polymers) and then reforming the internal portions of the extruded body by a compressive drawing operation to obtain channels of a desired size. The writing point thus formed has a longitudinally extending, axial, ink-conveying channel and circumaxial, spaced, ink-conveying channels, the axial channel having a cross-sectional area equivalent to a circle with a diameter between two and four mils. The enlarged circumaxial ink-conveying channels have an oblong cross-sectional shape approximately 1 to 3 mils. wide and 3 to 5 mils. in a radial direction. The circumaxial ink-conveying channels are connected to the axial channel by capillary channels having diameters of between 0.4 mils. and 1.0 mils. The longitudinal channels of the rods serve to deliver ink to the writing point by means of capillary action.

In each of the above cases, the ink is fed from a reservoir to the writing surface by means of the writing point. The reservoir which feeds the writing point may be either a container of liquid ink or a bundle of fibers saturated with ink. Either will perform equally in capillary writing instruments since dryout is attributable to changes occuring at the writing tip rather than inside the pen.

A problem with capillary type writing instruments is that when exposed to the atmosphere, as when left uncapped for a period of time, the water in the ink may evaporate so as to change the composition of the ink and make it more viscous. The capillaries within the tip of the writing instrument will then become clogged so that the written line produced becomes irregular. If left uncapped long enough, the composition of the ink at the tip may be so changed that it will not flow at all through the capillaries of the tip, writing becomes impossible, and the instrument must be discarded.

Attempts have been made to retard the rate at which water based inks dry out by adding humectant materials such as ethylene glycol, propylene glycol, and other higher molecular weight polyhydroxy compounds such as those described in U.S. Pat. No. 3,705,045. However, such materials tend to increase the viscosity of the ink to such an extent that it will not flow freely through the capillaries of capillary type writing instruments. Furthermore, the selective evaporation of the more volatile constituents of the ink may cause the inks to be thickened at the exposed tip of the instrument by the less volatile polyhydroxy compounds which remain. If additional polyhydroxy compound is used in the ink formulation, the gains from increased humectancy are lost to the increasing viscosity.

In an attempt to solve the point dryout problem, U.S. Pat. No. 3,519,443, describes inks formulated with formamide as a solvent to reduce the rate of point dryout. Formamide is somewhat toxic. This constitutes a disadvantage since capillary type writing instruments containing water-based inks may be used by children. In addition, formamide is suggested for use at concentrations from 10% to 100% of the total solvent content of the ink, levels at which a disagreeable odor may be produced.

In spite of the above attempts to reduce point dryout, problems still exist. Therefore, a need exists for ink compositions which not only reduce the rate of dryout, but allow rejuvenation even after dryout has occurred.

SUMMARY OF THE INVENTION

The present invention comprises an ink composition adapted for use in a capillary type writing instrument comprising an aqueous solution containing:

(a) from about 0.5% to about 15% by weight of a water soluble dye; and (b) from about 1% to about 25% of a quaternary ammonium compound of the formula:

$$RCH_2N(CH_3)_3{}^+X^-$$

wherein

R is —CH$_2$OH or —COOH, and

X is —OH, —Cl, —Br, or —I.

DETAILED DESCRIPTION OF THE INVENTION

Satisfactory operation of capillary type writing instruments is dependent upon a steady capillary flow of ink to the point which engages the paper or other writing surface. Thus, the ink used must be sufficiently fluid to assure free and continuous flow through the capillary passages from the reservoir to the writing tip. Conversely, problems can occur if the ink is too thin. Feathering (i.e. lateral wicking of the ink into the paper from the written line), and strike through (i.e. penetration of the ink to the back of the paper), are common problems when ink viscosity is too low. To make sure that the writing point is supplied a suitable amount of ink, the inks should be formulated to have a viscosity below 50 centipoises at 20° C. and, more preferably, a viscosity in the range between 2 and 5 centipoises.

In its simplest form, the present invention comprises an aqueous solution of a water soluble dye and a compound of the formula:

$$RCH_2N(CH_3)_3{}^+X^-$$

wherein
R is —CH$_2$OH or —COOH, and
X is —OH, —Cl, —Br, or —I.

Preferred quaternary ammonium compounds according to the invention are:

(β-hydroxyethyl)trimethylammonium chloride,

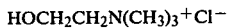

$$HOCH_2CH_2N(CH_3)_3{}^+Cl^-$$

and carboxymethyltrimethylammonium hydroxide,

$$HOOCCH_2N(CH_3)_3{}^+OH^-$$

The quaternary ammonium compound may be present in the composition from 1% to 25% by weight, preferably from 5% to 15%.

While an aqueous solution of a water soluble ink and a quaternary ammonium compound produce an acceptable ink, it is preferred to include at least one polyhydric alcohol in the ink formulation.

Polyhydric alcohols are used in the present invention to increase the viscosity of the ink thereby improving the characteristics of the line produced by the writing instrument and reducing strike through and feathering.

Polyhydric alcohols useful in the invention include alkylene glycols (e.g., ethylene glycol, propylene glycol, and butylene glycol), polyalkylene glycols (e.g., diethylene glycol and tripropylene glycol), mono- and di-alkyl ethers of polyhydric alcohols (e.g., ethylene glycol methyl ether, ethylene glycol ethyl ether, and ethylene glycol butyl ether) and trihydric alcohols (e.g., glycerin). The preferred alcohols are glycerin and ethylene glycol, and mixtures thereof.

The total amount of polyhydric alcohol employed in the compositions of the invention may be varied within wide limits as dictated by the viscosity considerations of the composition as discussed above. As will be appreciated by those skilled in the art, the amount of polyhydric alcohol employed depends in part on the molecular weight of the particular alcohol employed, since viscosity is generally directly proportional to molecular weight. In general, the polyhydric alcohol component of the invention constitutes from 1% to 50% by weight of the composition.

While any of the water soluble dyes typically used in ink formulations may be employed in producing inks in accordance with the present invention, acid dyes are preferred due to their high tinctorial strength. Such acid dyes possess one or more sulfonate groups attached to an aromatic nucleus, and can be classified according to their chemical structure into ten different categories: nitro, nitroso, monoazo, monoazo (metalized), disazo, triphenylmethane, xanthene, anthraquinone, azine, and quinoline. The amount of dye used will, of course, vary with the nature and color of the ink to be produced and may constitute from about 0.5% to 15% by weight of the total ink composition.

If desired, it is also possible to add other optional ingredients typically used in water based inks such as corrosion inhibitors (e.g., benzotriazole) and preservatives (e.g., methyl parasept).

The inks can be produced by the simple operation of mixing and dissolving the ingredients in any suitable way, but it is preferred that the ink components (with the exception of a quaternary ammonium compound of the present invention) be held at 55° C. with constant stirring for two hours after their initial mixing. When the ink cools to room temperature, a quaternary ammonium compound of the present invention is introduced with stirring and the ink formulation is then filtered.

The filtered ink is incorporated in any of the conventional capillary writing instrument types described above, by well known procedures. For example, the ink may be injected into the end of the reservoir opposite the writing point in a previously assembled porous point pen by means of a syringe. An alternate procedure, described in U.S. Pat. No. 3,581,378, is to first saturate a fibrous reservoir with ink, followed by insertion into the barrel of the porous point pen.

The inks of the present invention are designed for use in capillary type writing instruments where the writing point may be accidently allowed to dry out (e.g., by leaving the writing point uncapped for a period of time). Should that occur, the instrument may be rejuvenated, rather than being discarded as would be the case with pens containing prior art inks. Rejuvenation is accomplished by recapping the writing point and allowing the instrument to equilibrate for a few hours, after which the writing point will have regained its ability to produce a written line.

In order to illustrate typical and preferred ink compositions embodying the present invention, the following examples are included:

EXAMPLE I

Six percent by weight of a dye known as Color Index Acid Green 16 (C.I. #44025), 2% by weight of a dye known as Color Index Acid Yellow 11 (C.I. #18820), 1% by weight benzotriazole, 0.2% methyl parasept, 5% glycerin, and 12.5% ethylene glycol were mixed and dissolved in 73.3% by weight of water. The solution was held at 55° C., with constant stirring for two hours. After the ink was cooled, 10% by weight of (β-hydroxyethyl)trimethylammonium chloride was dissolved in the cooled solution. The ink formulation was then filtered and charged into capillary type writing instruments having writing tips formed of closely packed polyester fiber strands. Each pen was tested to make sure it would produce a written line, after which the uncapped pens were placed in a dessicator containing a saturated solution of MgCl$_2$.6H$_2$O to maintain a R.H. of approximately 33%.

Pens removed from the dessicator four, seven, and fourteen days later would not produce a written line since their writing points had dried out. However, when the pens were recapped and allowed to equilibrate for a few hours, the ability to write had been restored in all cases.

EXAMPLE II

| Ingredient | % by Weight |
| --- | --- |
| Color Index Acid Blue 9 (C.I. #42090) | 7.0 |
| benzotriazole | 1.0 |
| methyl parasept | 0.2 |
| glycerin | 5.0 |
| ethylene glycol | 12.5 |
| water | q.s. to 100 |

Procedure: The above ingredients are combined and heated to 55° C. for two hours with constant stirring. The solution is allowed to cool to room temperature, at which time 10% by weight of carboxymethyltrimethylammonium hydroxide is added with stirring. The ink formulation is then filtered and charged into capillary type writing instruments having writing tips formed by closely packed polyester fiber strands.

EXAMPLE III

| Ingredient | % by Weight |
| --- | --- |
| Color Index Acid Red 73 (C.I. #27290) | 8.0 |
| benzotriazole | 1.0 |
| methyl parasept | 0.2 |
| glycerin | 5.0 |
| ethylene glycol | 12.5 |
| water | q.s. to 100 |

Procedure: The above ingredients are combined and heated to 55° C. for two hours with constant stirring. The solution is allowed to cool to room temperature, at which time 10% by weight of (β-hydroxyethyl)trimethylammonium chloride is added with stirring. After filtering, the ink formulation is charged into capillary type writing instruments having writing tips formed of closely packed polyester fiber strands.

EXAMPLE IV

| Ingredient | % by Weight |
| --- | --- |
| Color Index Acid Blue 9 (C.I. #42090) | 7.0 |
| benzotriazole | 1.0 |
| methyl parasept | 0.2 |
| water | q.s. to 100 |

Procedure: The above ingredients are combined and heated to 55° C. for two hours with constant stirring. The solution is allowed to cool to room temperature, at which time 15% by weight of carboxymethyltrimethylammonium hydroxide is added with stirring. The ink formulation is then filtered and charged into capillary type writing instruments having writing tips formed by extruding, melt-drawing, and compressively drawing polyamide.

The pens containing the ink compositions set forth in Examples II, III, and IV can be rejuvenated after their writing points have dried out, by capping for a few hours. At that time, their ability to produce a written line will have been restored.

What is claimed is:

1. A writing system comprising a capillary type writing instrument charged with an aqueous solution containing:
   (a) from about 0.5% to about 15% by weight of a water soluble dye; and
   (b) from about 1% to about 25% of a quaternary ammonium compound of the formula $RCH_2N(CH_3)_3{}^+X^-$ wherein
   R is —CH$_2$OH or —COOH, and
   X is —OH, —Cl, —Br, or —I.

2. A writing system as described in claim 1 in which the percent by weight of said quaternary ammonium compound is from 5 to about 15.

3. A writing system as described in claim 1 in which said quaternary ammonium compound is (β-hydroxyethyl)trimethylammonium chloride.

4. A writing system as described in claim 1 in which said quaternary ammonium compound is carboxymethyltrimethylammonium hydroxide.

5. A writing system as described in claim 1 further including from about 1% to about 50% by weight of a water soluble polyhydric alcohol.

6. A writing system as described in claim 5 in which said alcohol is glycerin.

7. A writing system as described in claim 5 in which said alcohol is ethylene glycol.

* * * * *